United States Patent [19]

Suzuki et al.

[11] 4,088,300

[45] May 9, 1978

[54] FLOW CONTROL VALVE FOR HOT PITCH OR OTHER VISCOUS MATERIAL

[75] Inventors: Seiichi Suzuki; Tomizo Endo, both of Iwaki, Japan

[73] Assignee: Kureha Kagaku Kogyo Kabushiki Kaisha, Tokyo, Japan

[21] Appl. No.: 730,627

[22] Filed: Oct. 7, 1976

[30] Foreign Application Priority Data

Oct. 8, 1975 Japan .......................... 50-136609[U]

[51] Int. Cl.² .............................................. F16K 1/32
[52] U.S. Cl. .................................... 251/319; 251/214
[58] Field of Search ............... 251/214, 355, 119, 339, 251/318, 319; 137/339, 533.21, 533.29

[56] References Cited

U.S. PATENT DOCUMENTS

| | | | |
|---|---|---|---|
| 1,776,974 | 9/1930 | Henderson | 251/214 X |
| 2,553,991 | 5/1951 | Wagner et al. | 251/339 X |
| 2,845,306 | 7/1958 | Carver | 251/214 X |
| 3,581,728 | 6/1971 | Abraham | 251/355 X |

FOREIGN PATENT DOCUMENTS 1,803 12/1877 Germany ............................ 251/319

Primary Examiner—Arnold Rosenthal

[57] ABSTRACT

A flow control valve for hot pitch or other viscous material, wherein a valve rod is guided by a guide member which has radial indentations in its center aperture to define a number of narrow axial ridges around the circumference of the valve rod to provide stabilized guidance by linear sliding contact with the valve rod.

4 Claims, 4 Drawing Figures

FLOW CONTROL VALVE FOR HOT PITCH OR OTHER VISCOUS MATERIAL

BACKGROUND OF THE INVENTION

This invention relates to a valve for controlling the flow rate of hot pitch or other highly viscous fluids, and more particularly to an improved valve rod guide particularly suitable for use in flow control valves of the class just-mentioned.

A problem often encountered in controlling the flow rate of hot pitch at about 300°–400° C is that a rod of a flow regulator valve is seized in the rod guide due to intrusion of hot sticky pitch in the small clearance between the valve rod and the rod guide. This problem cannot be solved simply by increasing the diameter of the center aperture in the rod guide which slidably receives the valve rod.

It is an object of the present invention to provide a pitch flow control valve which will eliminate the above-mentioned problem It is a more particular object of the invention to provide a pitch flow control valve employing an improved valve rod guide which will preclude seizure of the valve rod due to intruding hot sticky pitch.

It is still another object of the present invention to provide a pitch flow control valve employing an improved valve rod guide which is provided with a center guide aperture having a number of narrow axial ridges around the circumference of the valve rod for linear sliding contact therewith.

SUMMARY OF THE INVENTION

According to the present invention, there is provided a flow control valve for hot pitch or other highly viscous fluids, comprising a housing having an inlet and an outlet and interiorly defining a fluid chamber in communication with said inlet, a valve seat provided centrally at the bottom of said fluid chamber to intercommunicate said fluid chamber with said outlet and a cylindrical cavity provided contiguous to and above said fluid chamber concentrically with said valve seat, a valve member having a rod extending axially through said cylindrical cavity and connected to an actuator which operates said valve member toward and away from said valve seat to control the flow rate of viscous fluid flowing from said inlet to said outlet through said fluid chamber, and a valve rod guide mounted securely in said cylindrical cavity and having a cylinder-like form with a center aperture for receiving said valve rod, said center aperture of said valve rod guide having radial indentations defining a number of narrow axial ridges around the circumference of said valve rod to guide axial movement of said valve rod by linear sliding contact therewith.

The above and other objects, features and advantages of the invention will become apparent from the following particular description of the invention and the appended claims, taken in conjunction with the accompanying drawing.

DESCRIPTION OF PREFERRED EMBODIMENTS

Figure 1:
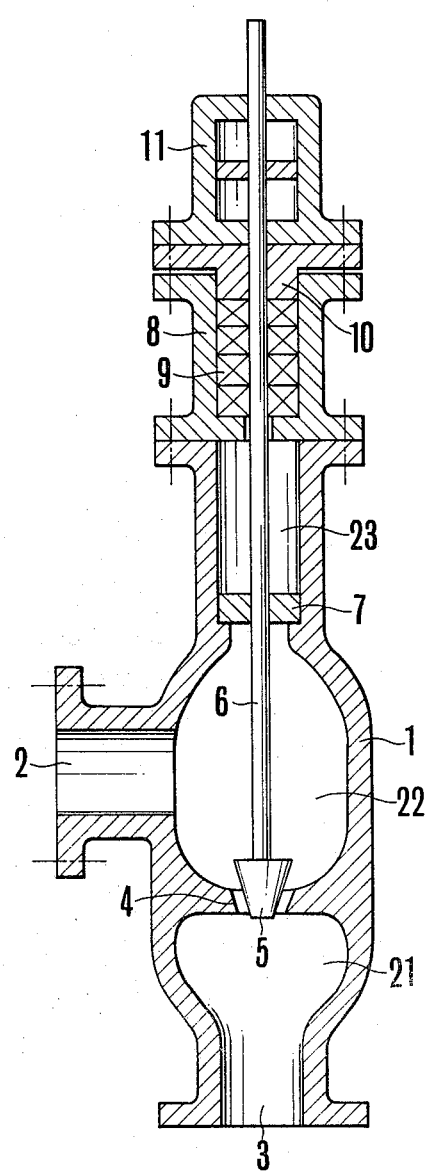
FIG. 1 is a longitudinal section of a choke valve employed for controlling the flow rate of hot viscous pitch.

Referring to the accompanying drawings and first to FIG. 1, there is shown by way of example a choke valve of a simple construction. The valve includes a housing 1 which interiorly defines a fluid chamber 22 in communication with an inlet 2 and with an outlet 3 through a port forming a valve seat 4 and a lower chamber 21. The housing 1 further includes an upper cylindrical cavity 23 with an annular flange at the upper end thereof.

The open area of the valve seat 4 is controlled by a valve 5 of a truncated cone shape. The valve 5 has a rod 6 which extends axially outwardly through the upper cavity 23 and is connected to an actuator 11 which operates the valve 5 toward and away from the valve seat 4 to attain a desired flow rate of the fluid which flows from the inlet 2 to the outlet 3 in the usual manner. A packing box 8 accommodating packing 9 is rigidly mounted between the upper flanged end of the upper cavity 23 and the actuator 11.

The axial movement of the valve rod 6 is mainly guided by a valve rod guide 7 which is mounted on a stepped surface at the bottom of the upper cavity 23 and a packing gland 10 at the upper end of the packing box 8. As for the valve rod guide 7, it has been the conventional practice to use a cylinder which, as shown at 7A in FIG. 2, is centrally provided with a round aperture of a diameter slightly larger than the diameter of the valve rod 6 for relative sliding movement.

Figure 2:
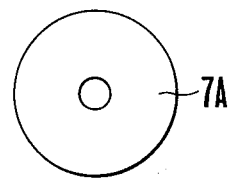
FIG. 2 is a diagrammatic view of a conventional valve rod guide.

The valve rod guide arrangement of FIG. 2 works without trouble as long as the fluid has low viscosity and suitable lubricating properties. However, as mentioned hereinbefore, when feeding hot viscous pitch at 300°–400° C or other highly viscous fluid, the valve rod 6 is easily seized and stuck in the valve rod guide 7A by the viscous fluid which intrudes into the small clearance between the valve rod 6 and the rod guide 7A. A mere increase of the guide aperture diameter will not solve the problem and will lead to another problem of unstable guidance.

Figure 3:
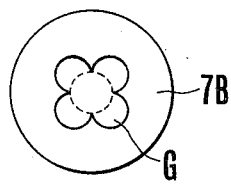
FIG. 3 is a view similar to FIG. 2 but showing a valve rod guide according to the present invention.

According to the present invention, the rod guide is also in the form of a cylinder but is centrally provided with a guide aperture G having a number of radial indentations defining narrow axial ridges around the circumference of the valve rod 6, as shown in FIG. 3.

In operation, the axial movement of the valve rod 6 is suitably guided by the axial narrow ridges of the rod guide 7B which are in relative sliding contact with the circumference of the valve rod 6 in a linear fashion to preclude the above-mentioned problem of rod seizure.

Figure 4:
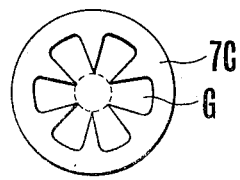
FIG. 4 is a diagrammatic view of a valve rod guide with a modified aperture pattern.

FIG. 4 shows at 7C a modification of the rod guide according to the invention, where the depths of the radial indentations are increased to present a guide aperture patterned like flower petals. Similarly, the narrow guide ridges between the deepended radial indentations are disposed around the valve rod 6 to provide linear contact therewith.

One of the advantages of the rod guide according to the invention is that it is very simple in construction and yet capable of completely precluding the seizure of the valve rod.

What is claimed is:

1. A valve for controlling the flow of highly viscous material, comprising:
   a housing provided with a fluid inlet, a fluid outlet, a fluid chamber in communication with said inlet, and a bore for providing a flow passage between the fluid chamber and the fluid outlet, said bore having a valve seat;
   a cylindrical cavity extending contiguously above said fluid chamber and disposed concentrically relative to said bore;
   a valve member having a rod extending through said fluid chamber and said cavity, and an element on one end of said rod cooperatively positioned relative to said bore and said valve seat to regulate the size of the flow passage through said bore;
   a cylindrical guide member disposed within said cavity and coaxially with said valve member rod and having an aperture for slidably receiving said rod; and
   a plurality of pointed axial ridges disposed around the circumference of the aperture of said guide member, said ridges alternately positioned with a plurality of radial indentations disposed around the circumference of said aperture, said ridges positioned to contact and to guide axial movement of said rod.

2. The valve of claim 1, additionally comprising:
   an actuator operatively connected to the other end of said rod for controlling axial motion of said valve member to regulate the position of said valve member element relative to said valve seat and said bore to control the flow of viscous material from said fluid chamber through said outlet; and
   a packing gland assembly disposed between said cavity and said actuator to provide a fluid seal for said actuator.

3. The valve of claim 2, wherein said guide member is a cylinder and said plurality of axial ridges are provided by the intersection of adjacent sides of a plurality of arcuate indentations adjacently spaced around the periphery of said aperture.

4. The valve of claim 3, wherein said guide member is a cylinder and said plurality of axial ridges are provided by the intersection of adjacent sides of a plurality of radially elongated, slot-like indentations adjacently spaced around the periphery of said aperture.

* * * * *